Nov. 24, 1964
R. J. COHEN
3,158,033
SPIN MOTOR MONITOR INCLUDING A VARIABLE
RELUCTANCE TYPE PICKUP
Filed Nov. 24, 1961
2 Sheets-Sheet 1
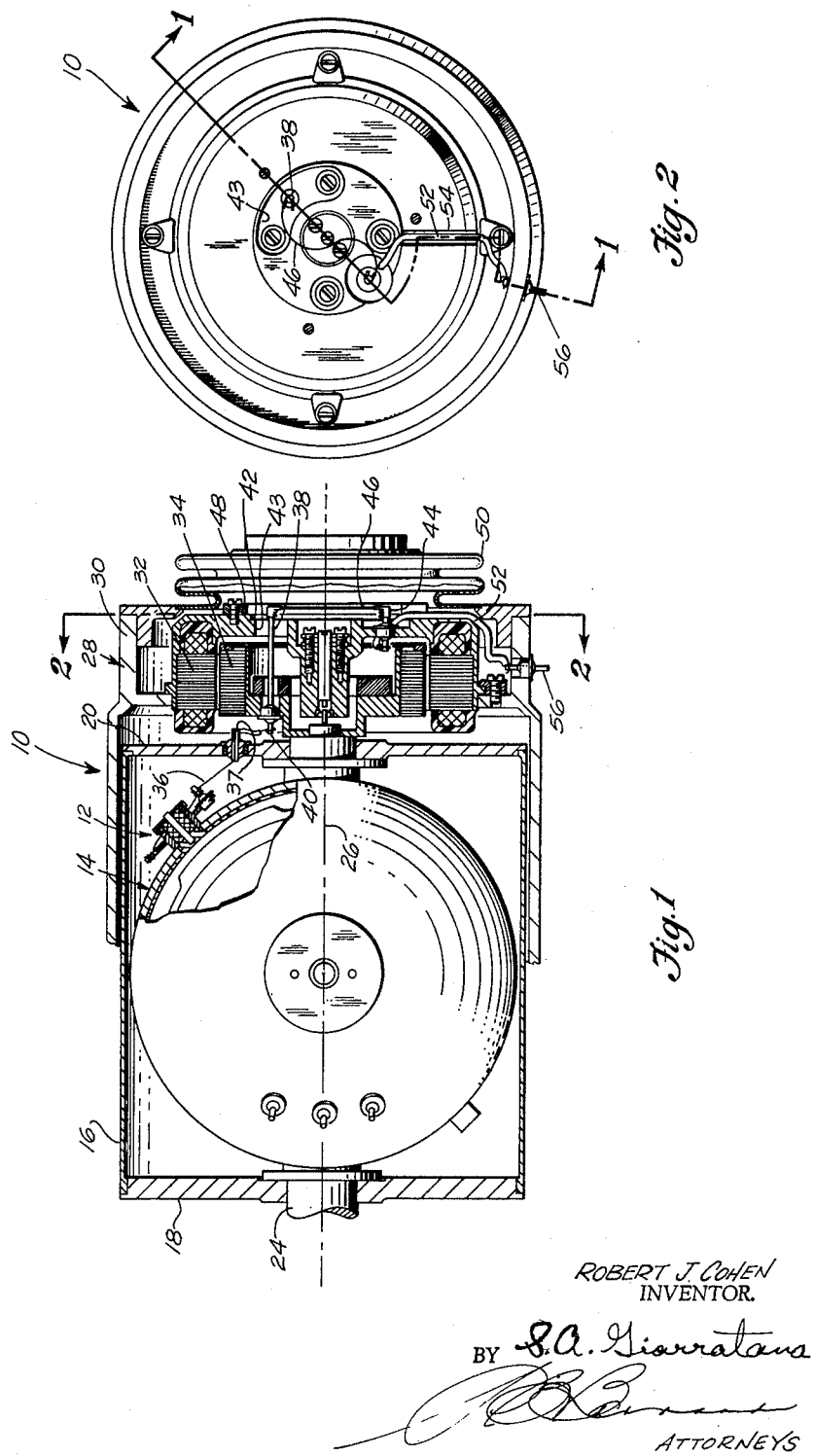
ROBERT J. COHEN
INVENTOR.
BY S. A. Giorratana
ATTORNEYS Nov. 24, 1964

R. J. COHEN 3,158,033

SPIN MOTOR MONITOR INCLUDING A VARIABLE
RELUCTANCE TYPE PICKUP

Filed Nov. 24, 1961

ROBERT J. COHEN
INVENTOR.

BY S. A. Giavratana

ATTORNEY

United States Patent Office 3,158,033
Patented Nov. 24, 1964

3,158,033
SPIN MOTOR MONITOR INCLUDING A VARIABLE RELUCTANCE TYPE PICKUP
Robert J. Cohen, Wyckoff, N.J., assignor to General Precision Inc., Little Falls, N.J., a corporation of Delaware
Filed Nov. 24, 1961, Ser. No. 154,608
2 Claims. (Cl. 74—5.6)

This invention relates to devices for monitoring the angular velocity of rotating elements, and more particularly to a transducer which produces a signal having a frequency proportional to the angular velocity of a rotating element, such as the wheel of a gyro motor.

In the past the r.p.m. of electric motors has been detected by monitoring the motor excitation current, or by observing the magnitude of the external magnetic field of the motor. These methods have several important disadvantages, including poor accuracy and severe variation in performance from motor to motor.

The present invention overcomes these disadvantages by providing, in accordance with one embodiment thereof, a signal generator having a pickup coil linked with the lines of flux of a permanent magnet and a magnetic circuit return path which includes an air gap. The magnetic flux linking the coil is a function of the reluctance of the magnetic circuit, including the air gap, and by mounting the generator adjacent to the periphery of a rotating element having magnetic segments thereabout of different radii, the reluctance of the air gap can be varied by the segments in a manner to generate a voltage in the pickup coil having a frequency dependent upon the number of different segments on the periphery of the rotating element and proportional to the angular rotational velocity of the rotating element.

Accordingly, it is one object of the invention to provide an electrical signal having a frequency proportional to the angular velocity of a rotating element.

It is another object of the invention to monitor the angular rotational velocity of a rotating element by linking a pickup coil with lines of flux of a magnetic circuit which includes an air gap, and varying the reluctance of the air gap by ferro-magnetic material on the periphery of the rotating element in a manner to generate an A.C. voltage in the pickup coil having a frequency proportional to the angular rotational velocity of the rotating element.

It is a further object of the invention to provide a generator for monitoring the angular rotational velocity of a rotating element, having a high signal to noise ratio and accurate frequency output dependent upon the speed of rotation of the rotating element.

It is a still further object of the invention to provide a generator of the type described above having an inherently low output impedance so that it can be connected to low impedance circuits without degradation of the output signal.

It is a still further object of the invention to provide a generator of the type described above that can be readily mounted on the wall of a gyro motor to produce a signal having a frequency dependent upon the angular rotational velocity of the gyro wheel, which frequency differs from the gyro motor excitation frequency so that a high signal to noise ratio can be obtained.

Other objects and features of novelty of the present invention will be specifically pointed out or will otherwise become apparent when referring, for a better understanding of the invention, to the following description taken in conjunction with the accompanying drawings, wherein:

FIG. 1 is a sectional view of a gyroscope having a generator embodying features of the invention mounted on the periphery of the gyro motor thereof;

FIG. 2 is a view of the right end of the gyroscope illustrated in FIG. 1 with the bellows removed;

Figure 3:
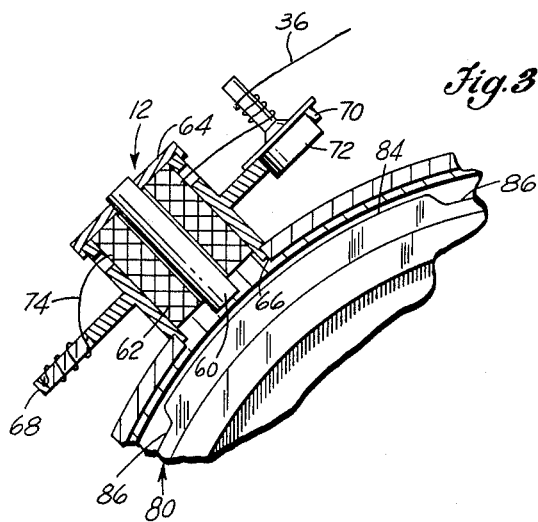
FIG. 3 is an enlarged fragmentary sectional view of the generator illustrated in FIG. 1.

Referring to the drawings, a gyroscope 10 is illustrated having a generator 12 embodying features of the invention mounted on the periphery of a gyro motor 14 as will be described in greater detail hereinafter. The gyroscope 10 comprises a cylindrical housing 16 having end walls 18 and 20 which pivotally support stub shafts 22 and 24 projecting from opposite sides of the gyro motor 14 so as to support the gyro motor for precession about an axis 26.

A torquer assembly 28 is mounted on the right end of the housing 16 for torquing the gyro motor in a conventional manner. It briefly comprises a torquer housing 30 which carries a torquer stator 32 therein in position to cooperate with a torquer rotor 34 mounted on the right end of the stub shaft 24 for pivotal movement with the gyro motor 14. Electrical connection is made to the generator 12 by a taut wire 36 extending between the generator and a hollow-pin terminal 37 which is sealed in a suitable aperture in the end wall 20 by a high melting temperature solder to allow soldering of leads to the pin without disturbing the seal. The tautness of the wire 36 is an important feature and prevents mass shift due to wire movement. A long gold plated terminal 38 is located in the torquer rotor 34 and the wire from the hollow pin terminal 37 is soldered to its short end 40. The torquer stator 32 is relieved as at 42 and has an arcuate slot 43 therein to allow the long terminal 38 to protrude above the surface of the stator.

A short gold plated terminal 44 is attached to the stator 32 directly opposite the long terminal 38 and the two are interconnected by a flex lead 46, preferably fabricated from 0.0002 x 0.0004 silver-copper wire and designed for maximum flexibility and therefore minimum restraint. A protective ring 48 is screwed to the torquer stator 32 to prevent damage to the flex lead and terminals due to movement of the conventional bellows 50 enclosing the torquer rotor and stator. A lead wire 52 is connected to the terminal 44 and passed through a groove 54 in the torquer stator and is connected to an additional terminal 56 in the cylindrical wall of the housing 30 which, in turn, can be connected to the instrument cable (not shown).

Referring particularly to FIG. 3 the generator 12 comprises a permanent bar magnet 60 preferably made of Alnico V upon which a bobbin-wound coil 62 of copper wire is concentrically mounted. These parts are cemented into a soft iron, cup-shaped housing 64 which serves as a magnetic return path. The open end of the cup-shaped housing 64 is fixed within an aperture 66 in the wall of the gyro motor 14 and flanges 68 and 70 project laterally outwardly from opposite sides of the cup-shaped housing. The flange 70 carries a terminal 72 about which the end of the taut wire 36 is wound and connected to one end of the pickup coil 62. The other end of the pickup coil is connected to a wire 74 which is connected to the flange 68 which provides a connection to ground through the ground connection of the gyro motor 14. With this construction an air gap is provided in the magnetic circuit of the generator between the inner end of the permanent magnet 60 and the edge of the cup-shaped housing 64, and the periphery of the gyro wheel 80 passes through this air gap as it rotates to vary the flux in the magnetic circuit linking the pickup coil 62 to generate a signal in the pickup coil as a function of the wheel speed.

Figure 4:
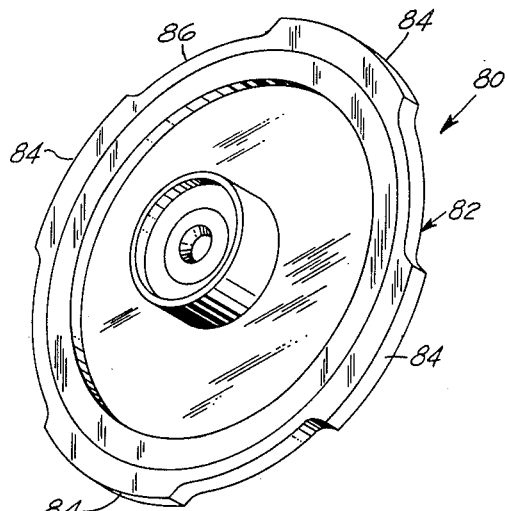
FIG. 4 is an isometric view of the gyro wheel of the gyroscope.

Referring particularly to FIG. 4 one embodiment of the gyro wheel 80 is shown in greater detail. A magnetic stainless steel ring 82 is shrink fitted on the periphery of the wheel 80 with the wheel mass being reduced to compensate for the additional mass of the ring 82 so that the gyro performance will not be affected. The ring is slotted in four places to produce alternately disposed, protruding segments 84 and recessed segments 86 having equal arcuate lengths. As the segments 84 and 86 rotate past the air gap of the generator 12, as most clearly illustrated in FIG. 3, they alternately decrease and increase the reluctance of the air gap to vary the flux linking the pickup coil 62 and produce a voltage at the terminals of the coil having a magnitude $E=44nfBA \times 10^{-8}$ volts, where $f$ is the frequency at which the segments 84 and 86 pass through the air gap, $n$ is the number of coil turns, B is the magnetic flux density in Gauss (actually it is the change in flux density between the two operating conditions), and A is the pole face area of the permanent magnet 60 in cm.$^2$.

The output impedance of the generator 12 is a function of coil inductance as follows: $Z=\sqrt{R^2+X_L^2}$, where Z is output impedance in ohms, R is effective (A.C.) resistance of the winding, $X_L$ is the inductive reactance of the coil and is given by the formula $X_L=2\pi fL$, where $f$ is the frequency of operation.

The general procedure for designing the generator is as follows. By assuming a value for effective coil resistance, the coil inductance may be computed from the impedance equation above. The inductance equation is then employed to determine the maximum number of turns required for magnetic circuit dimensions which in turn dictates the size of the package. By an iterative process the coil resistance and inductance are then refined to conform to the coil volume available. The magnet dimensions are essentially determined by the package size also, and the magnet output is computed by straightforward magnet design features. The output of the generator 12 must be evaluated for the two air gap lengths, namely the length of the air gap when the protruding segments 84 are positioned adjacent to the air gap and the length of the air gap when the recessed segments 86 are positioned adjacent thereto. The differential flux output for these two air gaps is then the usable B employed in the generated voltage equation $E=4.44nfBA \times 10^{-8}$ volts R.M.S. as mentioned previously.

Since the A.C. voltage produced by the generator is self-generated, and is dependent upon the number of segments 84 and 86 on the gyro wheel and the angular rotational velocity of the wheel in revolutions per unit time, it differs from the frequency of the gyro motor excitation current so that the signal to noise ratio can be very high. In addition, the generator has an inherently low output impedance so that it can be connected to low impedance circuits without degradation of the output signal.

While it will be apparent that the embodiment of the invention described above is well calculated to fulfill the objects of the invention, it will be appreciated that many changes, modifications, and revisions may be made without departing from the scope of the invention as defined in the following claims. For example, a non-magnetic gyro wheel could be substituted for the wheel 80 with its stainless steel ring 82, with protruding segments of magnetic material plated electro-chemically on the periphery of the non-magnetic wheel in spaced relation. Or, permanent magnets could be employed in the wheel at spaced points about the periphery thereof and the permanent magnet 60 replaced by a soft iron bar to provide a completely soft-iron magnetic return path around the pickup coil 62.

What is claimed is:

1. A generator for a gyro motor comprising a gyro motor housing, a gyro wheel rotatably mounted within said housing, a ring of magnetic material on the periphery of the gyro wheel, having alternately disposed protruding segments and recessed segments, an opening in the wall of said housing overlying the periphery of said ring, a cup-shaped housing of magnetic material having a cylindrical wall and an end wall substantially closing off one end thereof, a pickup coil positioned within said cup-shaped housing concentrically therewith, a permanent magnet positioned within said pickup coil concentrically therewith for producing flux passing from one end thereof through said end wall and said cylindrical wall of the cup-shaped housing and across an air gap between the open end of the cup-shaped housing to the other end of said magnet, said cup shaped housing being mounted on said gyro motor housing at said opening therein so that said air gap is exposed to the interior of said housing and closely overlies the alternately disposed segments of said ring, a gimbal housing surrounding said gyro motor housing, stub shafts projecting from opposite sides of said gyro motor housing in position to define a precession axis perpendicular to the spin axis of the gyro motor, said stub shafts being journaled in opposite walls of said gimbal housing, a torquer housing mounted on said gimbal housing in position to define a chamber adjacent to one of said walls of the gimbal housing, a torquer rotor positioned within said torquer housing and fixed to the stub shaft journaled in said wall for pivotal movement therewith, a torquer stator surrounding said torquer rotor and fixed to said torquer housing, means for grounding one end of said pickup coil, a first terminal fixed to and electrically insulated from said cup-shaped housing, the other end of said pickup coil being electrically connected to said terminal, a second terminal mounted on said one wall of said gimbal housing, a taut electrical lead wire interconnecting said first and second terminals, and electrical connecting means including a flexible lead for connecting said second terminal to an external terminal.

2. The invention as defined in claim 1 wherein said electrical connecting means comprises an elongated terminal mounted on said torquer rotor with one end thereof projecting through an enlarged opening in said torquer stator, flex lead means interconnecting said second terminal with the other end of said elongated terminal, a third terminal positioned on said torquer stator substantially diametrically opposite said one end of the elongated terminal, flex lead means interconnecting said one end of the elongated terminal with said third terminal means, and lead means for connecting said third terminal to a fourth terminal on the outside of said torquer housing.

References Cited by the Examiner
UNITED STATES PATENTS 2,683,224  7/54  Cole _____ 290—52
2,978,599  4/61  Wilcox _____ 310—168

ORIS L. RADER, Primary Examiner.

MILTON O. HIRSHFIELD, Examiner.